(12) United States Patent
Rapp

(10) Patent No.: US 7,453,627 B2
(45) Date of Patent: Nov. 18, 2008

(54) METHOD FOR CONTROLLING THE PUMP POWER OF AN OPTICAL AMPLIFIER

(75) Inventor: Lutz Rapp, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/596,531

(22) PCT Filed: Dec. 15, 2004

(86) PCT No.: PCT/EP2004/053511

§ 371 (c)(1), (2), (4) Date: Jun. 15, 2006

(87) PCT Pub. No.: WO2005/057813

PCT Pub. Date: Jun. 23, 2005

(65) Prior Publication Data

US 2007/0103767 A1    May 10, 2007

(30) Foreign Application Priority Data

Dec. 15, 2003    (DE) .............................. 103 58 698

(51) Int. Cl.
*H01S 3/00*    (2006.01)
(52) U.S. Cl. .............................. 359/341.41; 359/341.43
(58) Field of Classification Search ............ 359/341.41, 359/341.43, 337
See application file for complete search history.

(56) References Cited

U.S. PATENT DOCUMENTS

| 6,163,399 | A  |   | 12/2000 | Berg |
| 6,341,034 | B1 |   | 1/2002  | Sun et al. |
| 6,366,393 | B1 |   | 4/2002  | Feulner et al. |
| 6,407,854 | B1 |   | 6/2002  | Shum |
| 6,414,788 | B1 |   | 7/2002  | Ye et al. |
| 7,158,290 | B2 | * | 1/2007  | Oota et al. ............... 359/341.4 |
| 2001/0043389 | A1 | * | 11/2001 | Bonnedal et al. ........ 359/341.41 |
| 2003/0053200 | A1 |   | 3/2003  | Goobar et al. |
| 2004/0021932 | A1 | * | 2/2004  | Maurer et al. .......... 359/341.41 |

FOREIGN PATENT DOCUMENTS

EP    1079481    2/2001

OTHER PUBLICATIONS

"Superior high speed automatic gain controlled erbium doped fiber amplifiers", Nakaji et al., Optical Fiber Technology 9 (2003) pp. 25-35.
Mann, Shiffelgen, Froriep, "Einfuhrung in die Regelungstechnik" Hanser-Verlag Muenchen, vol. 7, 1997.

* cited by examiner

*Primary Examiner*—Mark Hellner
(74) *Attorney, Agent, or Firm*—Bell, Boyd & Lloyd LLP

(57) ABSTRACT

The present disclosure relates to a method for regulating a pump power of an optical amplifier, where a multiplexed broadband optical signal having several channels is amplified at a certain gain value while a change in power is detected at the input or output of the amplifier. A new pump power is calculated and adjusted based on a previously provided stable gain state of the optical amplifier after detecting the change in power such that deviations of the gain value remain minimal as planned temporary interface transients during a specific interval. The new pump power is thus calculated very accurately and quickly according to a model that takes into account the actual gain value, the wavelength dependence of active channels, aging effects, and non-linear amplification effects.

7 Claims, 8 Drawing Sheets

METHOD FOR CONTROLLING THE PUMP POWER OF AN OPTICAL AMPLIFIER

FIELD OF TECHNOLOGY

The present disclosure relates to a method for controlling the pump power of an optical amplifier.

BACKGROUND

Wavelength Multiplex Division (WDM) technology) offers the option of connecting transmitters and receivers in different places directly via optical paths of a network, without an electro-optical conversion being required at nodes. In the future it will also be possible to set up and clear down optical paths as required with the aid of optical switching matrices. Compared to the current prior art, major cost savings can be achieved without having to compromise the flexibility of the connections.

However the dropping and adding of transmitted signals in channels of a multiplex transmission system causes strong variations in power on individual link sections. To avoid bit errors at the end of the link the amplifier gain for the channels continuing to be transmitted or those being added may not change. FIG. 1 shows the average gain G of all channels over time for an individual amplifier stage and for two different cases, in which case it has been assumed that at time zero the input power reduces by 19 dB by dropping channels.

If the pump power is kept constant (see the solid curve), the gain G of 20 dB before the dropping process increases to a constant value of 30 dB after the dropping process. A further curve drawn in this Figure shows, by way of illustration, the timing curve when using a simple integral controller which ensures that the average gain after a synchronization process with a duration of over 20 ms again amounts to 20 dB. The overshoots and undershoots can be greatly reduced by more complex regulation, but cannot be completely eliminated. In a cascade of amplifiers the end result can thus be an accumulation of power variations and thus bit errors or even destruction of the receive diodes.

Overshoots and undershoots can be almost completely eliminated if the pump power required after a change in the input signal to maintain the gain under stable conditions is already known at the time of the change of load at the input. The actual difficulty lies in calculating this pump power in advance with the highest possible accuracy.

A simplest solution to this provides for choosing a linear approach for the required pump power as a function of the signal input power at the optical amplifier. This aspect is described in U.S. Pat No. 6,414,788 B1 and U.S. Pat. No. 6,341,034 B1, the contents of which are incorporated by reference in their entirety. In this case two constant parameters are employed. With this method however the following significant influencing variables are not taken into account:

The required pump power not only depends on the input power but also on the gain of the relevant amplifier stage. Since the stage of an amplifier can exhibit very different gain values, depending on use and channel occupation, marked variations emerge which adversely affect the determination of the correct pump power to be set.

No account is taken of the fact that the pump power required depends on the wavelength of the surviving channels in a drop process. This also applies to the so-called "gain ripple".

"Fitting parameters" for determining the pump power values to be set are defined at the start of operation, so that aging effects lead to increasing variations as the operating life increases.

Non-linear effects in an amplification fiber of a fiber amplifier, such as "Excited State Absorption" in an Erbium-doped fiber of an EDFA (Erbium Doped Fiber Amplifier), continue to be ignored and thus lead to additional deviations.

To take account of the spectral dependency it is proposed in document 6341034 that a spectral filter be fitted before an input monitor at the optical amplifier. The wavelength dependency of the method can thus be improved, if not eliminated entirely. Because of the high costs of components however this method is unlikely to be used.

In U.S. Pat. No. 6,366,393, which is also incorporated by reference in its entirety as in the document previously mentioned, a control unit for the gain of an optical amplifier is presented which opts for a linear approach for the required pump power as a function of the signal input power at the optical amplifier. The error implied in this approach is correct by means of a correction loop which is located after the amplifier and contains a microprocessor. This correction does not include wavelength dependency, making the method slow and imprecise.

In US Patent Publication 2003/0053200, which is also incorporated by reference in its entirety, the pump power of the optical amplifier is set using a feed forward control loop. In this case a small part of the WDM signal is routed through a filter of which the filter transfer function is adapted to the characteristics of the amplifier. The signal input power is weighted selectively by the filter as a function of the wavelength. The influence of the wavelengths with above-average effects on the decay rate of the amplifier energy level excited is increased or decreased in this case. The signal arrives at a photo detector after the filter which is connected to a control unit of the pump power of the amplifier.

In US Patent Publication 2001/0043389, which is incorporated by reference in its entirety, the amplifier gain is controlled by means of a forward and backward loop. The forward loop (feed forward loop) controls the amplifier by means of a fast photo diode, which measures the input power. The backward loop regulates the amplifier gain slowly depending on the output power of the amplifier. The two loops are connected to one another for checking the pump laser unit. The gain of the amplifier is essentially set by the backward loop, whereas the forward loop includes the compensation of offsets in the gain curve of the optical amplifier.

In U.S. Pat. No. 6,407,854, which is incorporated by reference in its entirety, a feed-forward control of an optical amplifier in a WDM system is presented. The pump power of the amplifier is set via a control unit which measures the input power of the amplifier and controls the current of the pump laser diodes as a function of the measurement level. In this case the electrical signal of the pump laser diodes can be changed by multiplication by a factor or by addition of an offset, to guarantee a gain curve of the amplifier which remains constant over the entire wavelength range. With this method synchronization processes of less than 200 μs are achieved.

In "Superior high-speed automatic gain controlled erbium-doped fiber amplifier", Nakaji H., Nakai Y., Shigematsu M and Nishimura M., Optical Fiber Technology 9 (2003), pp. 25-35, a method for suppressing cyclic gain variations over time in a surviving channel of a WDM during the adding or dropping of further channels of the WDM signal is described. An EDFA is used for amplification of the WDM signal which operates with a pump source at 980 nm or with a pump source at 1480 nm. When a pump laser in the wavelength range of 1480 nm is used and with an optimum setting of the control parameters for a specific application case overshoots during dropping of a channel can be almost completely avoided. By contrast, when a pump laser in the range of 980 nm is used a small overshoot occurs after dropping of channels. If the pump power is now reduced or adapted to a new value, not as assumed above at the point of switching, but somewhat earlier, e.g. by a delay element connected upstream from the amplifier, the overshoot when using a pump source at 980 nm can be almost completely eliminated. This method is based on the fact that the reduction of the output power (effect) is detected later than the reduction of the input power (cause), so that the gain control is made to think for a period corresponding to the delay that there is a strong increase in gain to which it reacts by reducing the pump power. Experimental gain measurements can be verified from this literature reference. In any event a very short duration overshoot continues to occur.

This method, which is referred to below as the "feedback method" is well suited to laboratory experiments but can barely be used for commercial systems, since the optimal time delay depends on the number of surviving channels, no specification is known for predefining this optimum delay and the control parameters are only optimized for a specific event. In practice any given events, i.e. the dropping of a different number of channels for example, are taken into account. The time delay should be constantly recalculated and set for this, which would however be impossible or unrealizable in real time. Thus the wavelength-dependent gain curve experiences unavoidable variations for one or more surviving channels which adversely affect the broadband gain, in addition to the known timing variations of the channel-related gain. For these reasons this method is not suitable for current optical switching networks.

SUMMARY

Under an exemplary embodiment, a method and system is disclosed which guarantees the optimum control of the pump power of an optical amplifier for amplification of an optical multiplex signal with a number of channels, so that when the input or output power at the optical amplifier is changed, the wavelength-dependent gain curve for signals of active channels to be amplified is maintained.

Starting from a stable state, which was set by regulation for example, especially of the corresponding pump power of an optical amplifier, with which an optical wavelength division multiplex signal with a number of channels is amplified and in which a change of the input power or output power of the wavelength division multiplex signal is detected, in accordance with the embodiment, after the change to the input power, a new value of the measured pump power is calculated and set so that the gain curve of the amplifier only changes minimally.

The new pump power to be set can be computed shortly after the dropping or adding of active channels and still set in good time, since the gain of an EDFA remains quasi-constant as a function of the wavelength in a short period of time.

A significant advantage of the disclosed method is to be seen in the fact that many significant influencing variables such as the current gain value, the wavelength dependency of active channels, aging effects and non-linear effects of the amplification are taken into account when calculating the new pump power to be set, so that a highly accurate determination of the optimum pump power is quickly undertaken and disruptive transients, i.e. amplitude and duration of overshoots, are effectively suppressed.

New pump powers can also be continuously calculated and set for example, as well as being calculated and set in advance. In such cases interpolation values from the previously calculated pump powers can continue to be determined.

By measuring the output power shortly after a jump is detected, the wavelength dependency can be fully taken into account. Aging effects are compensated for since the advance calculation of the pump power is undertaken relative to the previously available stable state of the amplification. Likewise, the current amplifier gain is included in the calculation and non-linear effects in the amplified fiber, as for example with "Excited State Absorption", are taken into account. "Gain Ripple" also does not lead to any change in the gain of the individual channels. What is of particular importance is that this method, as well as those already used in the prior art, does not need any additional measurement devices or components and is therefore greatly of interest from the cost standpoint.

In the following description, an inventive method is illustrated preferably for an amplifier stage which contains an Erbium-doped fiber. The method can however also be used for a number of cascaded amplifier stages with possibly different amplification fibers and/or pump sources. An exemplary embodiment for using a number of pump sources in an amplifier stage is even explicitly described.

A model is also disclosed, which enables a new pump power required to be determined or calculated from a previously available stable state of the optical amplifier. To this end, further restricted aspects are also considered it and their influences on the model analyzed.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 2:
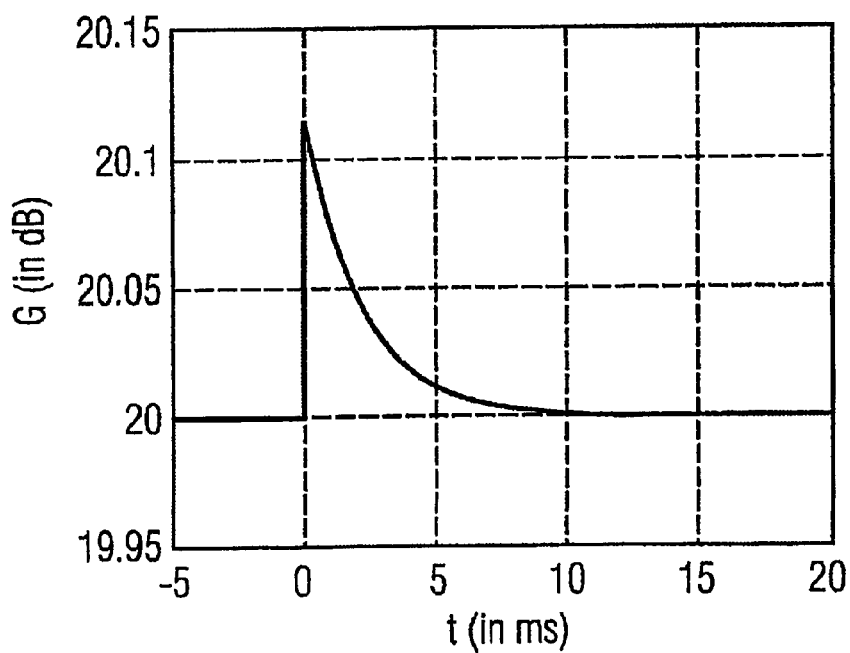
FIG. 2 illustrates the timing gain curve for dropping of active channels with feed forward controlling.

FIG. 2 shows a gain curve G over time during dropping of active channels with feed forward controlling in a single-stage Erbium-doped fiber amplifier, with the pump power required with reduced input power for maintaining the gain being set at the point at which the load changes. An undershoot is completely suppressed in this case.

A description is given below of how, starting from a known operating state of the fiber amplifier, the pump power required to maintain the gain $P_{pump}^{after}$ can be calculated.

The method is explained with reference to a suitable modeling of the amplifier process in the Erbium-doped fiber. All the power specifications below relate to the start or the end of the doped fiber. Available measuring devices (including photo diodes) are however generally calibrated to record powers present at the input or output of the amplifier or the amplifier card. Passive components such as couplers and isolators are mostly located between the inputs and outputs of the amplifier card as well as the corresponding ends of the amplification fiber. In this case a correction of the power specifications by the attenuation losses of the upstream and downstream components is also required. Likewise losses between the measuring device for the pump light and the coupling-in point in the Erbium-doped fiber are taken into consideration. The powers actually coupled into or out of the doped fiber are the result of the correction.

In addition a further correction step is required in order to determine the actual effective pump power, since, as a result of the loss mechanism in the fiber, not all photons coupled into the doped fiber participate in the amplification process. This is especially required for the use of pump sources with an emission wavelength in the range of 980 nm, since in this case ions which have already been excited, which are at a higher energy level, can absorb pump power, whereby pump photons are lost to the actual amplification process. This process is referred to as the "pump excited state absorption (ESA)". To make a distinction, the term for the effective pump power Peff is introduced which designates the pump power effectively available to the amplification process.

All power variables subsequently specified are to be used in the linear scale (mW).

Starting from the pump power $P_{pump}$ coupled-in in the fiber the effective pump power Peff can be calculated with the aid of the equation $$P_{eff} = P_0 \cdot \ln\left\{1 + \frac{P_{pump}}{P_0}\right\},$$

with the symbol $P_0$ standing for a correction parameter. This should be known during the operation of the amplifier in a transmission system and is best defined on calibration of the amplifier card.

The characteristic parameters $P_0$ are therefore determined together with a second characteristic parameter $G_{norm}$ before the calculation process within the framework of the fiber amplifier through measurement. With this measurement the pump power required for maintenance of a predetermined gain value is plotted against the input or output power of the fiber amplifier. In this case it is of advantage not to change the channel assignment and to realize different input powers by the same attenuation of all channels.

The measurement process makes use of the fact that the pump power required to maintain a predetermined gain value of an Erbium-doped fiber without loss mechanisms is a linear function of the input power. For the larger pump power values, a deviation from a straight line occurs. This deviation is conditional on the pump ESA. The parameter P0 is now determined by fitting. To this end, the effective pump powers produced from the measured pump powers are calculated for different values of $P_0$ and the curve is approximated by a straight line in accordance with the minimum error square criterion. The total of the error squares is shown as a function of $P_0$. The value now selected for $P_0$ is that value which leads to a minimum total of the error squares. This value produces a curve, which describes the effective pump power $P_{eff}$ as linear function of the input power of the amplifier. The second characteristic parameter $G_{norm}$ for the fiber amplifier can now be derived from the slope of the straight lines determined in this way. The change in the effective pump power $P_{eff}$ is logically combined with corresponding changes to the input power via the proportionality constant.

$$\alpha = \frac{\bar{\lambda}_{signal}}{\lambda_{pump}} \cdot \frac{G_{sig} - 1}{G_{norm}}.$$

where the two wavelengths $\bar{\lambda}_{signal}$ and $\lambda_{pump}$ designate the mean signal wavelength or the pump wavelength. The parameter $$G_{sig} = \frac{P_{sig,out}}{P_{sig,in}}$$

generally represents the relationship between an input signal power and an output signal power. Since, apart from $G_{norm}$, all other variables are known, the second characteristic parameter can now be uniquely determined. The value of $G_{norm}$ typically lies in the range between 0.95 and 1.00. After the determination of the two calibration parameters $P_0$ and $G_{norm}$ the pump power required to maintain the gain after a switching process $P_{pump}^{after}$ is now calculated. Starting from the measured pump power $P_{pump}^{before}$ before the switching process, the effective pump power $P_{eff}^{before}$ can be calculated with the following formula $$P_{eff}^{before} = P_0 \cdot \ln\left\{1 + \frac{P_{pump}^{before}}{P_0}\right\}. \quad (1)$$

With the sum signal power $P_{sig}^{vor}$ before the switching process the value of the effective pump power for the signal power $P_{sig}^{before}$ after the switching process is produced as $$P_{eff}^{after} = P_{eff}^{before} + \frac{\bar{\lambda}_{signal}}{\lambda_{pump}} \cdot \frac{1}{G_{norm}} \cdot \left\{P_{sig,out}^{after} - P_{sig,in}^{after} - P_{sig,out}^{before} + P_{sig,in}^{before}\right\} \quad (2)$$

with the formula expressions occurring having the following meaning:

$P_{sig,out}^{after}$ the accumulated output power produced after the switching process with the gain remaining the same (i.e. stable state), $P_{sig,in}^{after}$ the accumulated input power after the switching process, $P_{sig,out}^{before}$ the accumulated output power before the switching process, $P_{sig,in}^{before}$ the accumulated output power after the switching process, The two wavelengths $\bar{\lambda}_{signal}$ and $\lambda_{pump}$ stand for the average signal wavelength after the switching process or for the pump wavelength respectively. From the effective pump power to be set after the switching process, the actual pump power to be set by the control at the fiber input can now be defined by inversion of equation (1), which leads to the result $$P_{pump}^{after} = P_0 \cdot \left[ \exp\left\{ \frac{P_{eff}^{after}}{P_0} \right\} - 1 \right]. \tag{3}$$

As a general rule, the precise channel occupancy after the switching process is only known with a clear delay and is thus not available for regulation. In this case, the average wavelength of the signal with full occupancy of the amplification band can be employed for the average signal wavelength.

Under specific circumstances, equation (2) can be simplified, so that simplifications of the amplifier structure become possible. Two possible simplifications are illustrated below:

For calculating the pump power $P_{pump}^{after}$ after the switching process, in accordance with eqn. (2) the accumulated powers on the input and output side must be known both before and also after the switching process. Because of the required regulation times of a few μs, both the measurement devices at the input of the amplifier stage and also those at the output have short measurement times. This demand for short measurement times can however be restricted to the point in time after the switching process, since it is assumed that the switching process starts from a stable state. Individual amplifier stages typically exhibit a gain of 20 dB or more, which means that the output powers are approximately two orders or magnitude greater than the input powers. Especially critical as regards the dynamic behavior are also switching processes in which the accumulated input power and thus also the accumulated output power fall sharply (e.g. by more than 10 dB). This means however that the second term in the curly brackets of eqn. (2) $P_{sig,in}^{nach}$, is far smaller than the other terms and can consequently be ignored. This means that the equation for $$P_{eff}^{after} \approx P_{eff}^{before} + \frac{\bar{\lambda}_{signal}}{\lambda_{pump}} \cdot \frac{1}{G_{norm}} \cdot \left\{ P_{sig,out}^{after} - P_{sig,out}^{before} + P_{sig,in}^{before} \right\} \tag{4}$$

can be simplified. In this equation $P_{sig,out}^{after}$ is the only variable for which only short periods are available for its measurement. Thus the use of the fastest possible photo diodes is only appropriate for measurement of the accumulated output powers whereas slower measurement equipment can be used to measure the accumulated output power. This is of interest, since by dispensing with a bias voltage, the sensitivity of photo diodes can be increased because of the lower dark current.

On the other hand, a simplification of eqn. (2) is produced for the case in which the average amplifier gain does not change, which poses a significant problem for the calculation of the output power produced after the switching process where the gain curve remains the same. In this case equation (2) can be transformed into $$P_{eff}^{after} = P_{eff}^{before} + \frac{\bar{\lambda}_{signal}}{\lambda_{pump}} \cdot \frac{G_{sig} - 1}{G_{norm}} \cdot \left\{ P_{sig,in}^{after} - P_{sig,in}^{before} \right\} \tag{5}$$

with $$G_{sig} = \frac{P_{sig,out}^{before}}{P_{sig,in}^{before}}.$$

Again only a fast measuring device is required, in this case for measurement of the accumulated output power. The equation can however be rewritten so that short measurement times are only needed for the measurement equipment at the output of the Erbium-doped fiber.

It should be pointed out here however that the gain of an amplifier stage of an EDFAs is as a rule, especially if does not contain a smoothing filter, different for the individual channels.

When a number of pump sources are used in the optical amplifier the basic method is identical to the method with only one pump source. Initially the pump powers available in the reference state are converted separately in accordance with equation (1) into effective pump powers, with under some circumstances different parameters $P_0$ having to be used for the individual pump sources. The effective pump powers $P_{eff,i}^{before}$ are then subsequently weighted with the quotients from the average signal wavelength $\bar{\lambda}_{signal}$ and the relevant pump wavelength $\lambda_{pump}^i$. The sum of these variables produces an auxiliary variable $X_{eff}^{before}$:

$$X_{eff}^{before} = \sum_{i=1}^{N} \frac{\lambda_{pump}^i}{\bar{\lambda}_{signal}} \cdot P_{eff,i}^{before},$$

with N designating the number of pump sources The auxiliary variable $X_{eff}^{after}$ to be set after the switching process correspondingly produces:

$$X_{eff}^{after} = X_{eff}^{vor} + \frac{1}{G_{norm}} \cdot \left\{ P_{sig,out}^{after} - P_{sig,in}^{after} - P_{sig,out}^{before} + P_{sig,in}^{before} \right\}.$$

It is of little consequence for the maintenance of the gain how greatly the individual pump sources contribute to this required value. However there can be preferences, which, for example, are the result of the requirement for the optimum possible noise figure and depend on the selected pump configuration. Once the contributions of the individual pump sources are defined, these are multiplied by the quotients from the average signal wavelength $\bar{\lambda}_{signal}$ and the corresponding pump wavelength $\lambda_{pump}^i$. This means that the relevant effective pump powers are now available again, which are converted according to equation (3) into the actual pump powers $P_{pump}^{after}(i)$.

The method described above is based on the assumption, which is almost always fulfilled, that the pump powers coupled-in at the location of an amplifier fiber feature wavelengths from different absorption bands.

Figure 3:
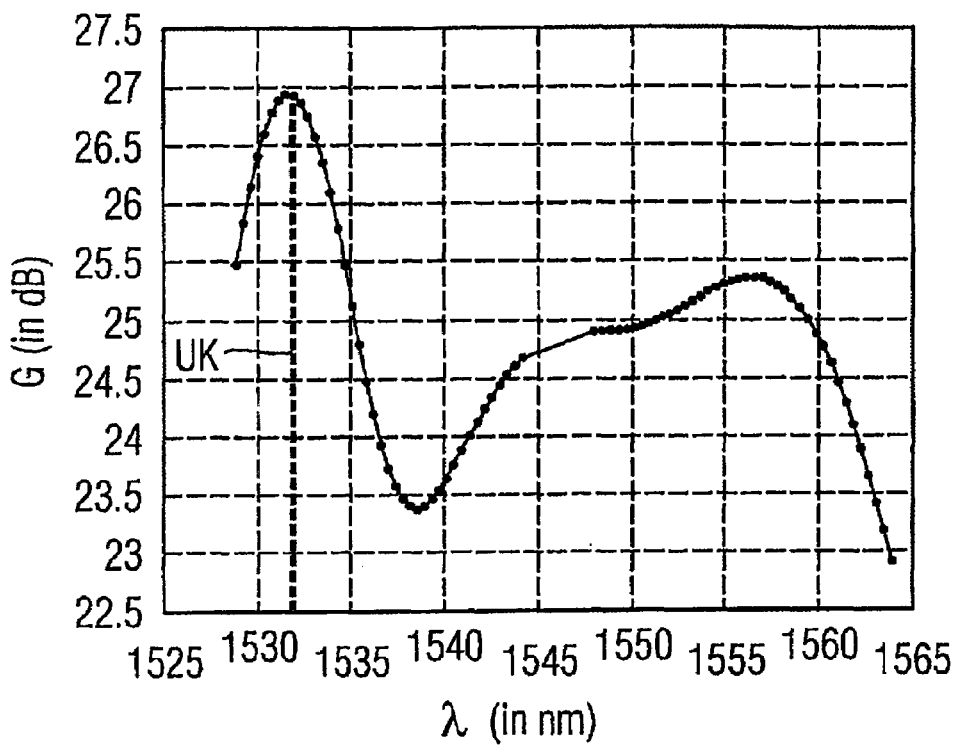
FIG. 3 illustrates the gain spectrum of an EDFA for 80 active channels.

FIG. 3 shows an example of the curve of gain G as a function of the wavelength for 80 channels of a WDM signal.

As an example the case in which all channels except for the marked surviving channel UK are dropped is now considered. The actual goal of the regulation is not to keep the average gain, as results from an overall power measurement at the input and at the output of the stage, constant. Instead, it is necessary to make sure that the gain curve does not change over the wavelength, since only then does the power which falls on the relevant receiver remain constant over time. In the above example this requires a change of average gain.

Figure 1:
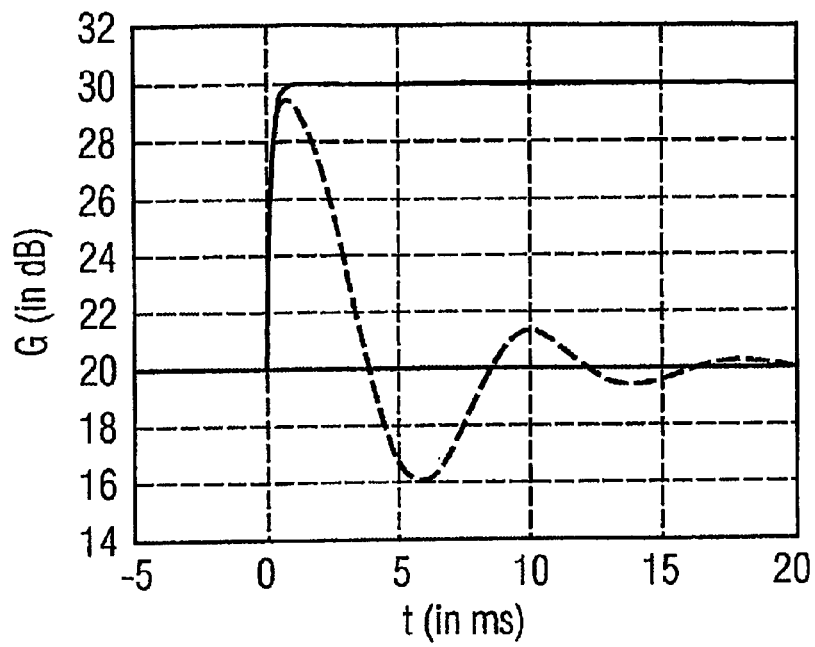
FIG. 1 illustrates an average gain of channels for an individual amplifier stage according to the prior art.
Figure 4:
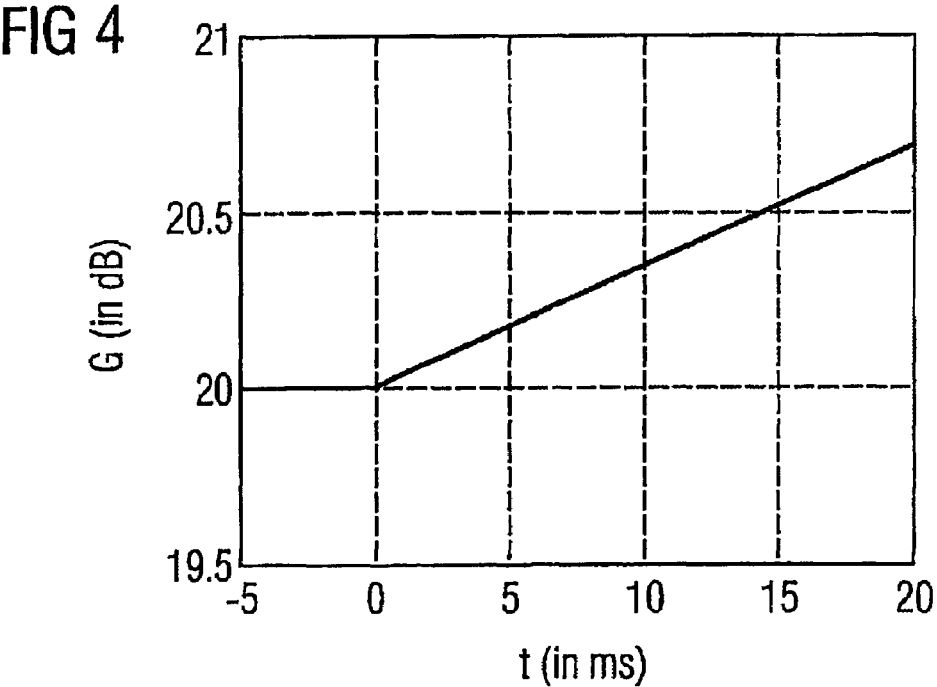
FIG. 4 illustrates a gain curve over time of a surviving channel (extract from FIG. 2)

The dynamic properties of an Erbium-doped fiber are helpful in determining a new required gain. Even with a sudden change of the input power the average occupancy inversion and thereby the gain profile only changes slowly. FIG. 4 shows a section of the gain over time of the solid line curve already shown in FIG. 1 for a pump power which remains constant with a jump in the input power of 19 dB and for example for the surviving channel UK, which for large periods of time asymptotically approaches a limit value of 30 dB. Within the first 10 µs after the switching process, the gain of the observed channel only changes slightly however. This period of time can therefore be used to determine the desired output power after the switching process and the corresponding average gain with changed spectral power distribution.

Figure 5:
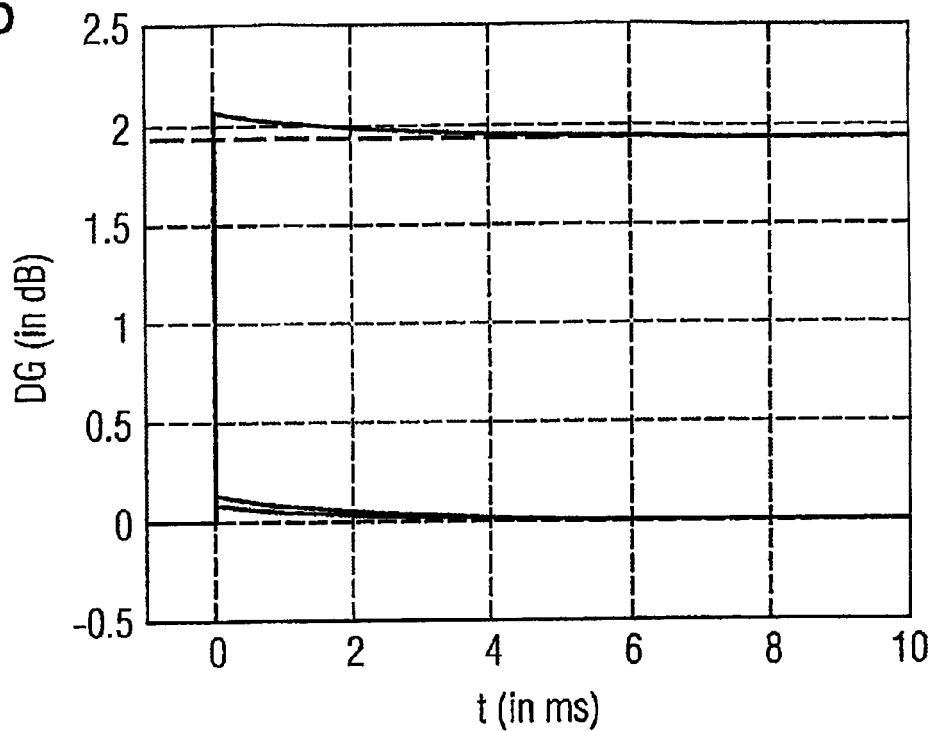
FIG. 5 illustrates gain variations over time for the channels within 10 ms after the drop time.
Figure 6:
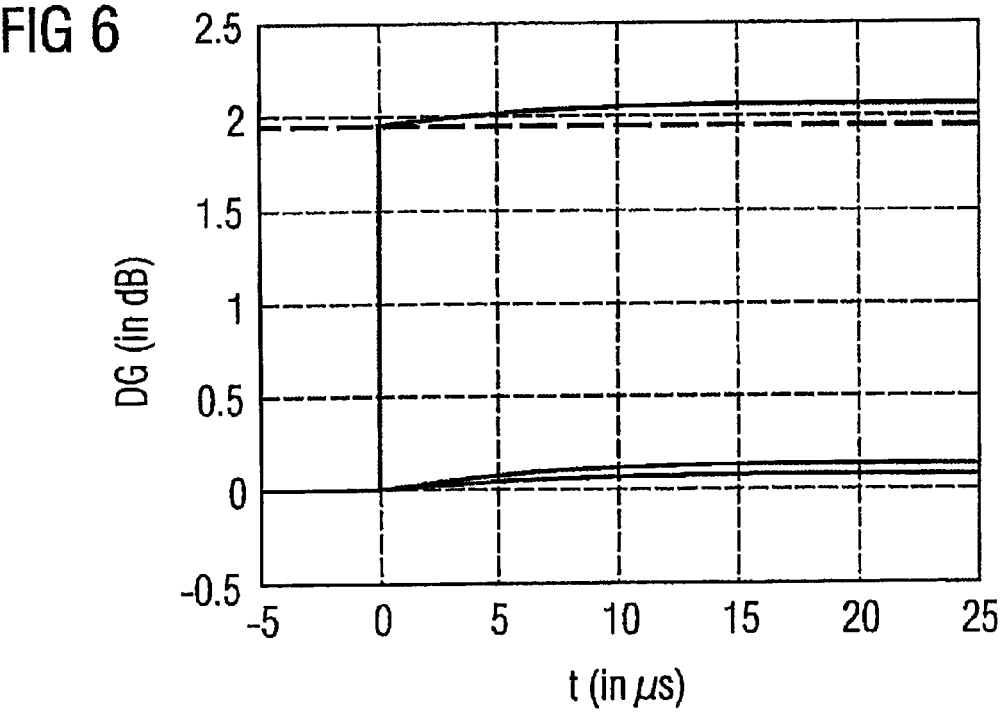
FIG. 6 illustrates gain variations over time for the channels within 25 µs after the drop time.

For the exemplary embodiment presented above, in which all of 80 channels except one channel are preferably dropped at 1531.9 nm, the dynamic behavior of the fiber amplifier EDFA is shown in the further FIGS. 5 and 6. The changes in gain for individual channels over time DG(t) are shown for different wavelengths (curves shown in the range of 0 dB) as well as the change in the average gain (curve shown with a jump at appr. 2 5 dB) in relation to the state before the switching process at t=0 ms. The dashed horizontal line shown at appr. 2 5 dB specifies the gain change after the synchronized state is reached. FIG. 6 is slowed-down version of FIG. 5 in the range of a few milliseconds before and after the switching process of channels.

Figure 7:
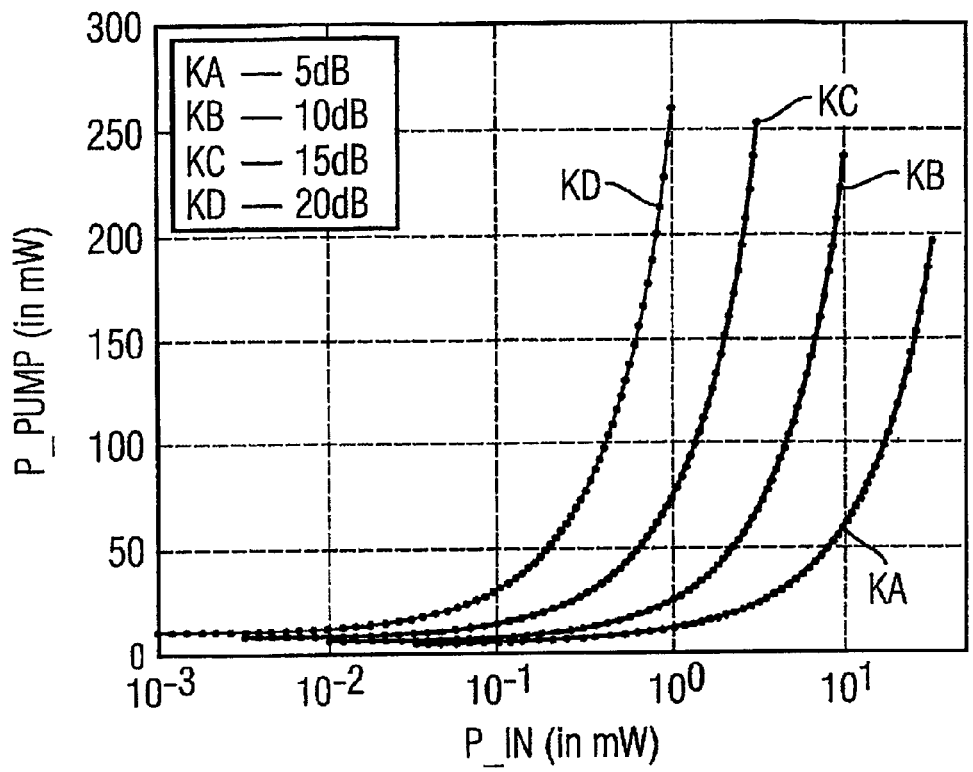
FIG. 7 illustrates actual and model-related pump power to be set as a function of the input power.

The next Figure, FIG. 7 shows a required, i.e. nominal pump power P_PUMP shown by solid curves KA, KB, KC, KD as a function of the input power P_IN of the fiber amplifier, which is to be set for maintaining different average gain values 5, 10, 15, 20 dB according to a switching process according to FIG. 4 to 6. For verification of the method described above, starting from the data point with the maximum input power in each case, the pump power is determined in accordance with the above method according to the equations (1) to (6) and the relevant result is shown by dots in FIG. 7. In this case there is a very good match between the pump powers determined by simulation with the previously calculated values.

Figure 8:
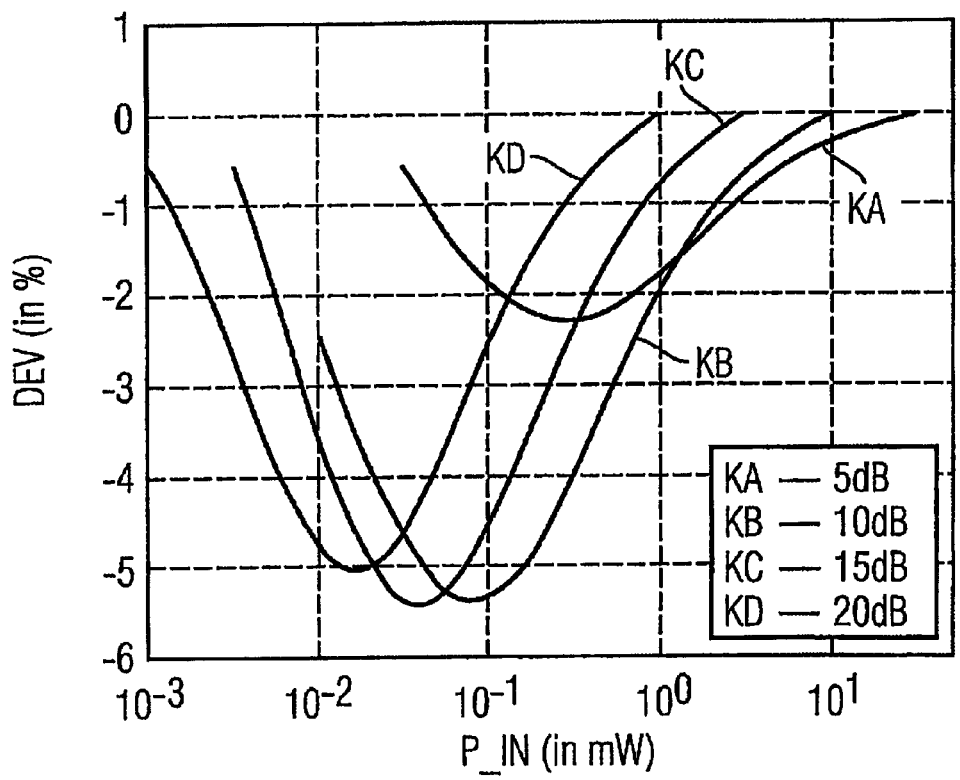
FIG. 8 illustrates variations between required and model-related pump power values to be set.

By way of illustration FIG. 8 shows, in accordance with curves KA, KB, KC, KD and the points entered from FIG. 7, the relative deviation DEV between the required nominal pump power and the inventive prior calculation of the pump power. In this case the maximum relative deviation amounts to appr. 5%.

Figure 9:
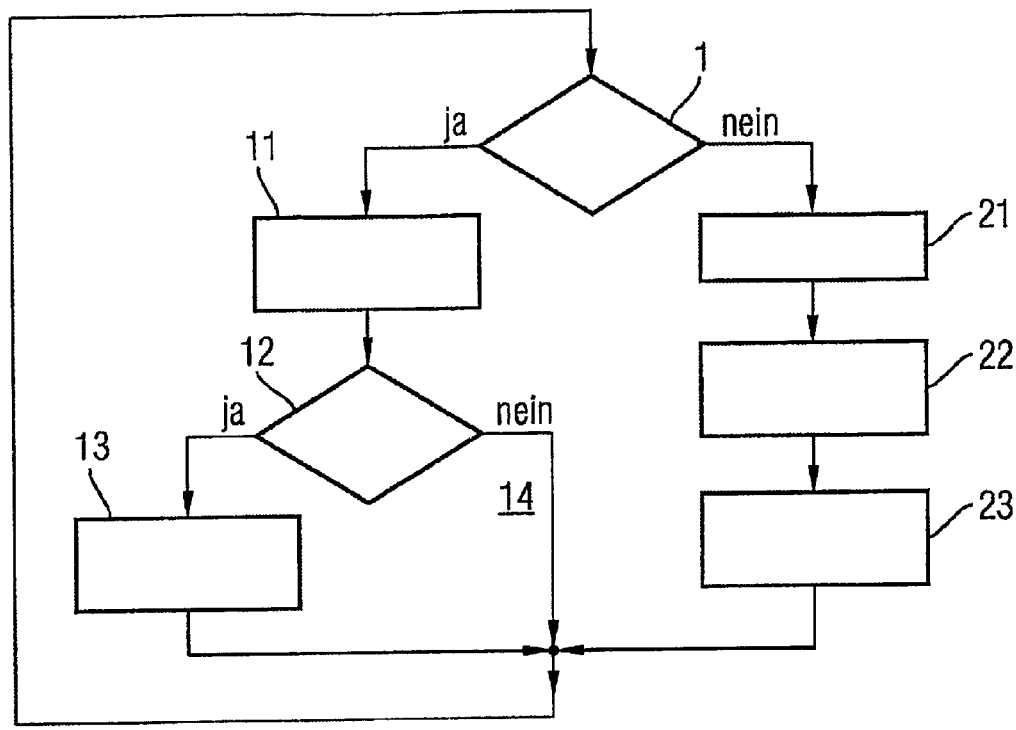
FIG. 9 illustrates a dynamic control concept.

It was previously assumed that the input power when channels are dropped falls immediately from a start value to an end value. In the following section, a method is now described with effects occurring on the remaining overshoots of the gain for the case described, in which the input power during a fall time (see FIGS. 10*a* to 10*e* with FIG. 11) falls linearly from its start value to the end value. Under these assumptions FIG. 9 shows a dynamic control concept for executing the method.

Initially a check is made as to whether the input power has been constant for a predetermined period of time (step 1). If it has been, the amplifier is driven with the conventional control concept with feedback (step 11) (see e.g. Mann, Schiffelgen, Froriep, "Einführung in die Regelungstechnik (introduction to control technology)", Hanser-Verlag, Munich, 7th edition, 1997). If a stable state is reached here (step 12), this is defined as a new reference state (step 13). If on the other hand the input power is not constant, i.e. if a change of the input power is detected during the predetermined period (step 1), a switch is made to the inventive feed forward operation (step 21). The pump powers to be set are calculated (step 22) and set (step 23) in this case after each time interval based on the last reference state and the current values for the input power and the output power. Subsequently another check is again made as to whether the input power has already been constant for a constant period of time (step 1).

As before, starting from 80 channels, all channels except for one are preferably dropped at 1531.9 nm. Changes in gain over time of the surviving channel with different drop times or periods of 1 µs, 10 µs, 100 µs and 1 ms are shown in FIGS. 10*a*, 10*b*, 10*c* and 10*d* by means of a solid line curve and also for fall times of between 10 ns and 1 ms in FIG. 10*e* overlaid over each other, with the time and the value of the maximum change in gain $G_{max}$ being shown by a dot. For better understanding, the curve shown by a dotted line shows the timing of the falling input power in the linear scale.

A slight overshoot is typically produced with a sudden change in the input power, and an exact advance calculation of the pump power needed in the stable state. Basically the opportunity would exist for these errors to accumulate with a repeated application of the predictive setting of the pump power using the current measured output power and for a divergence of the method to result. This is however not the case.

Figure 10A:
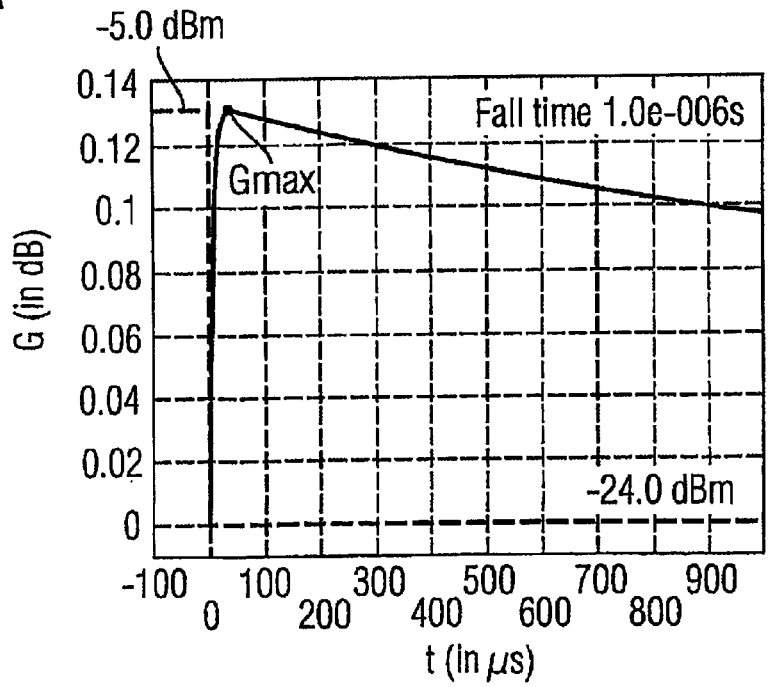
FIG. 10 illustrates gain curves over time of the surviving channel with different drop times of the other channels
 (a) Drop time: 1 µs
 (b) Drop time: 10 µs
 (c) Drop time: 100 µs
 (d) Drop time: 1 ms
 (e) Drop time: 10 ns to 1 ms.
Figure 10B:
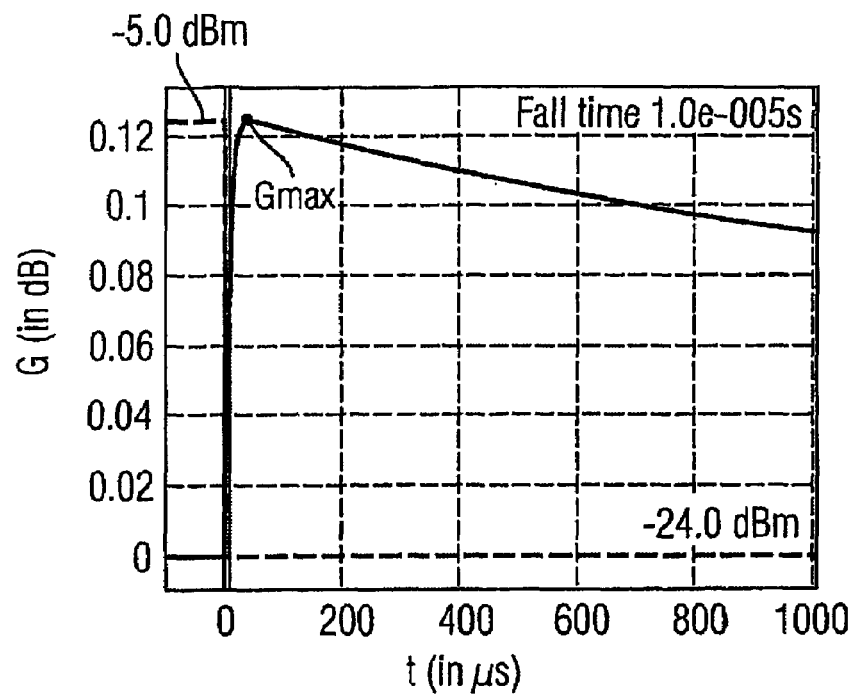
Figure 10C:
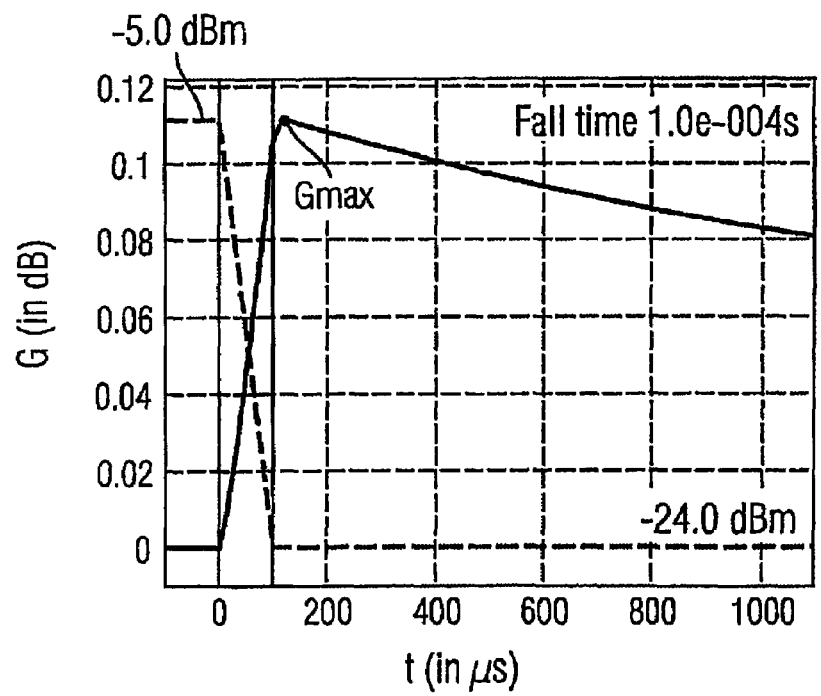
Figure 10D:
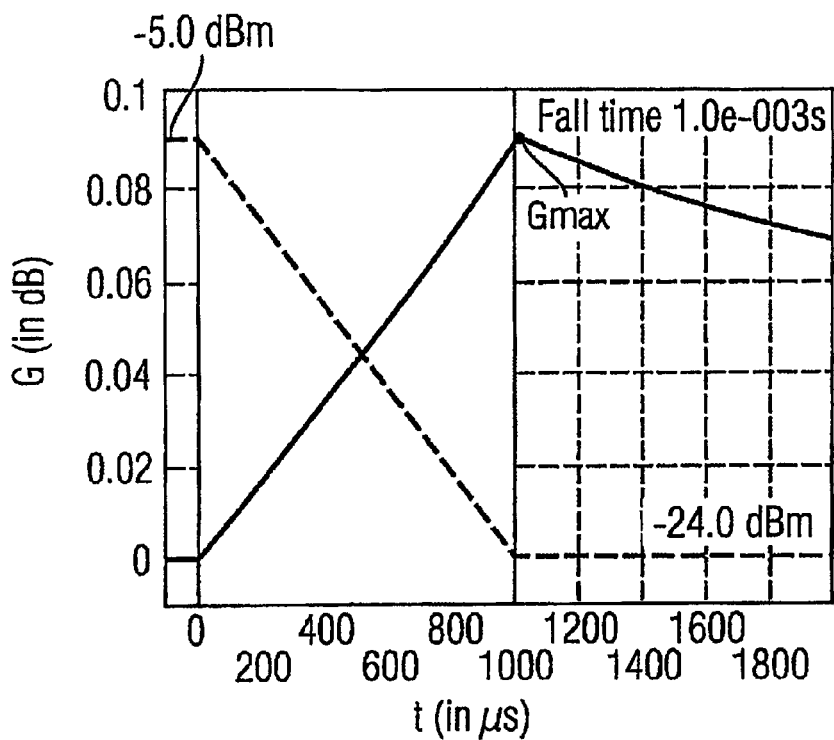
Figure 10E:
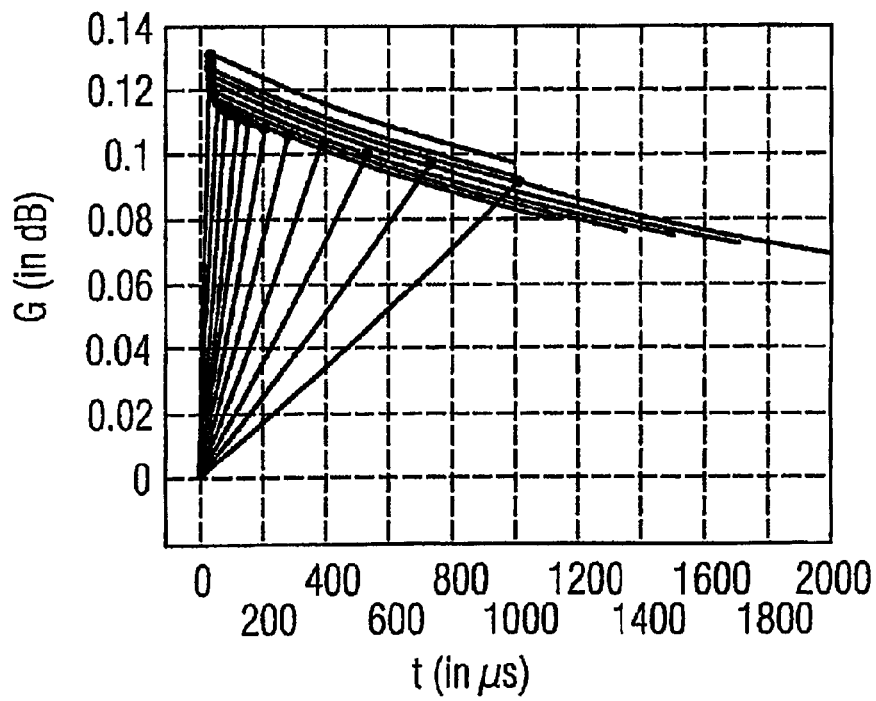

In FIG. 10*e* the changes in gain produced for the different fall times in the range of 10 ns to 1 ms of the "surviving" channel are shown overlaid, with the dots again marking the maximum change in gain $G_{max}$ in each case. Notably the synchronization process for large lengths of time is only slightly dependent on the fall time.

Figure 11:
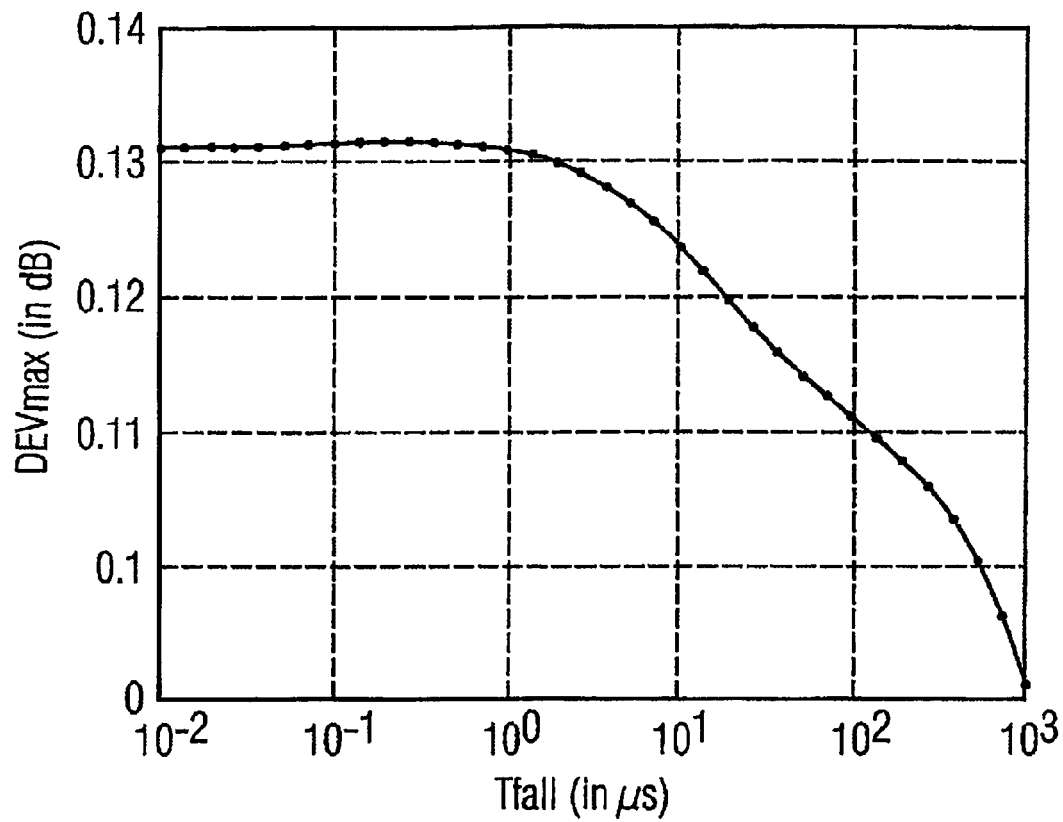
FIG. 11 illustrates an amplitude of the overshoot for different drop times of channels.

To supplement FIG. 10*e*, FIG. 11 shows the overshoot occurring $DEV_{max}$ as a function of the fall time $T_{fall}$. For fall times of less than 1 µs a constant value is produced, whereas for larger fall times the strength of the overshoot reduces the more the fall time increases.

Figure 12:
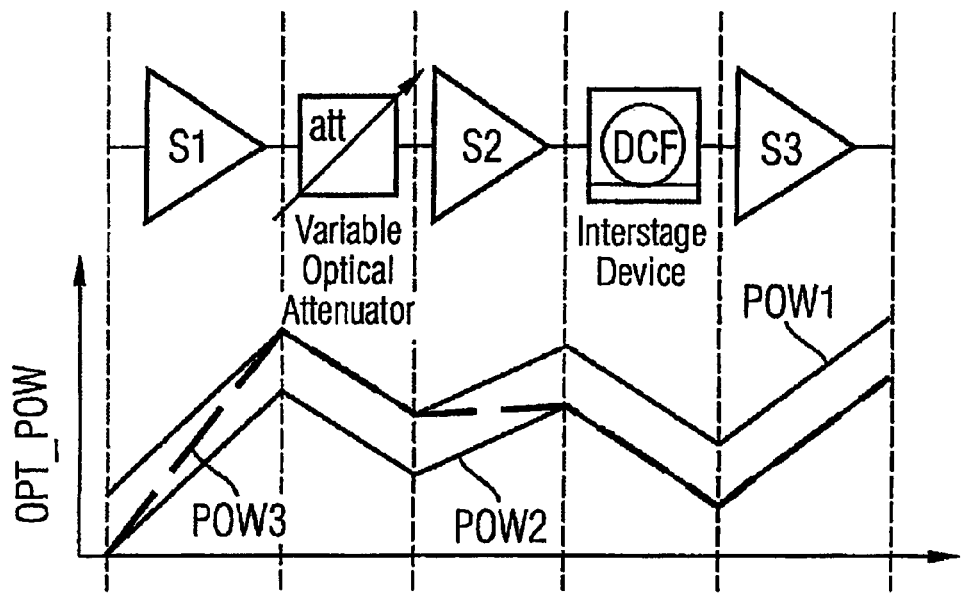
FIG. 12: the regulated power distribution of a three-stage fiber amplifier.

Furthermore FIG. 12 shows the controlled power distribution OPT_POW of a three-stage fiber amplifier consisting of the amplifier stages S1, S2 and S3, of which the gain can be varied with the aid of a variable attenuation element att connected between the first amplifier stages S1, S2. A further optical module DCF can be inserted between the two last stages S2, S3, which for example allows the adding and dropping of wavelength-related channels or compensation of the link attenuation.

In this case the power distribution OPT_POW along the entire fiber amplifier for different operating states is shown. The power curve POW1 shows the power distribution obtaining in the fiber amplifier before the switching process, which has reached a stable state and offers and for which an existing channel occupancy offers an optimum noise figure. To avoid overshoots and undershoots or to keep them as low as possible, the individual amplifier stages are kept at constant gain directly after the switching process with the aid of feed forward controlling, so that a second power curve shown POW2 is produced directly after the switching process.

Since however this is not optimal as regards the noise figure, a slow regulation after the input signal is stable ensures that the power curve slowly moves from the second power curve POW2 to a further power curve POW3 shown here as a broken line. This process takes place slowly so that this function can be undertaken using conventional regulation.

Since the gain of the individual amplifier stages S1, S2, S3 should not change in a first time interval, the accumulated signal powers to be set after the switching process at the input of each stage can be calculated independently of each other. The pump powers required can be determined directly on the basis of the formulae already presented.

Under some circumstances the available computing power is not sufficient to calculate the new pump powers required in real time after the switching process. In this case there is the option of prophylactically creating a table directly after a stable state is reached which contains the pump power required for maintenance of the gain for a suitable number of signal input powers which serve as reference values for in interpolation in the switching processes.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for adapting a pump power of an optical amplifier, comprising:
   receiving an optical wavelength multiplex signal having a number of channels of different wavelengths;
   amplifying the optical wavelength multiplex signal;
   calculating a state of gain curve for the amplification of new input channel powers;
   detecting a change in input or output power, wherein when the change of input power occurs within a time interval that is smaller than a reaction time of the amplifier, the accumulated input and output power is measured, and, using the measured state of gain, a new pump power value is determined in a wavelength dependent manner so that a wavelength dependent gain curve of the amplifier becomes substantially constant.

2. The method in accordance with claim 1, wherein the state of gain is measured from a stable state.

3. The method in accordance with claim 1, wherein the new pump power ($P_{pump}^{after}$) is defined in accordance with a switching process changing the input power by the following characteristics:

$$P_{pump}^{after} = P_0 \cdot \left[ \exp\left\{ \frac{P_{eff}^{after}}{P_0} \right\} - 1 \right] \text{ with}$$

$$P_{eff}^{after} = P_{eff}^{before} + \frac{\overline{\lambda}_{signal}}{\lambda_{pump}} \cdot \frac{1}{G_{norm}} \cdot \left\{ P_{sig,out}^{after} - P_{sig,in}^{after} - P_{sig,out}^{before} + P_{sig,in}^{before} \right\} \text{ and}$$

$$P_{eff}^{before} = P_0 \cdot \ln\left\{ 1 + \frac{P_{pump}^{before}}{P_0} \right\}$$

with the variables ($P_{sig,out/in}^{after}$) being measurement variables which are recorded within a period of a few 10 μs after the switching process in which the gain of the amplifier changes, and wherein ($P_{sig,out}^{after}$) designates the accumulated output power after the switching process, ($P_{sig,in}^{after}$) is the accumulated input power after the switching process, ($P_{sig,out}^{before}$) is the accumulated output power before the switching process, ($P_{sig,in}^{before}$) is the accumulated input power before the switching process, ($\overline{\mu}_{signal}$ and $\mu_{pump}$) are the average signal wavelength after the switching process or the pump wavelength, ($G_{norm}$, $P_0$) are two calibration parameters of the optical amplifier, ($P_{pump}^{before}$) is the measured pump power before the switching process and $P_{eff}^{before/after}$ are effective powers which do not take account of any loss mechanisms.

4. The method in accordance with claim 2, wherein given an average gain of an EDFA amplifier without smoothing filter, the new effective pump power $P_{eff}^{after}$ is calculated in accordance with the characteristic:

$$P_{eff}^{after} = P_{eff}^{before} + \frac{\overline{\mu}_{signal}}{\mu_{pump}} \cdot \frac{G_{sig} - 1}{G_{norm}} \cdot \left\{ P_{sig,in}^{after} - P_{sig,in}^{before} \right\}$$

with $$\left( G_{sig} = \frac{P_{sig,out}^{before}}{P_{sig,in}^{before}} \right)$$

designating the ratio of the average gain over the entire wavelength range and being assumed to be approximately constant before and after the switching process.

5. The method in accordance with claim 1, wherein for a slow change of the input power, the calculation and the setting are executed successively.

6. The method in accordance with claim 2, wherein, during stable states, new values of the pump power are calculated and read into a table, said values serving as support points for an interpolation for setting new pump powers for switching processes.

7. The method in accordance to claim 3, wherein for N pump sources the effective pump powers before the switching process $P_{eff,1}^{before}$ of each pump source are weighted and accumulated with the quotients from the average signal wavelength $\overline{\mu}_{signal}$ and the relevant pump wavelength $\mu_{pump}$ according to the formula $$\mu_{eff}^{before} = \sum_{i=1}^{N} \frac{\mu_{pump}}{\mu_{signal}} \cdot P_{eff,i}^{before},$$

and the effective overall pump power after the switching process $X_{eff}^{after}$ is calculated from the measured accumulated input and output powers before and after the switching process and the calibration parameter $G_{norm}$:

$$\mu_{eff}^{after} = \mu_{eff}^{before} + \frac{1}{G_{norm}} \cdot \left\{ P_{sig,out}^{after} - P_{sig,in}^{after} - P_{sig,out}^{before} + P_{sig,in}^{before} \right\}.$$

* * * * *